United States Patent
Chung et al.

(10) Patent No.: US 10,218,486 B2
(45) Date of Patent: Feb. 26, 2019

(54) METHOD FOR TRANSMITTING AND RECEIVING SIGNAL FOR LOW LATENCY IN WIRELESS COMMUNICATION SYSTEM AND APPARATUS THEREFOR

(71) Applicant: LG ELECTRONICS INC., Seoul (KR)

(72) Inventors: Jaehoon Chung, Seoul (KR); Genebeck Hahn, Seoul (KR); Eunjong Lee, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 15/116,194

(22) PCT Filed: Mar. 2, 2015

(86) PCT No.: PCT/KR2015/001981
§ 371 (c)(1),
(2) Date: Aug. 2, 2016

(87) PCT Pub. No.: WO2015/137654
PCT Pub. Date: Sep. 17, 2015

(65) Prior Publication Data
US 2017/0012747 A1 Jan. 12, 2017

Related U.S. Application Data

(60) Provisional application No. 61/952,150, filed on Mar. 13, 2014.

(51) Int. Cl.
*H04J 3/00* (2006.01)
*H04L 5/00* (2006.01)
(Continued)

(52) U.S. Cl.
CPC .......... *H04L 5/006* (2013.01); *H04J 11/0079* (2013.01); *H04L 5/0007* (2013.01);
(Continued)

(58) Field of Classification Search
CPC .............................. H04L 5/006; H04L 5/0055
See application file for complete search history.

(56) References Cited

U.S. PATENT DOCUMENTS

| | | | |
|---|---|---|---|
| 8,159,979 B2 * | 4/2012 | Lee | ........................ H04L 5/0062 370/280 |
| 8,665,907 B2 | 3/2014 | Kim et al. | |

(Continued)

FOREIGN PATENT DOCUMENTS

| | | |
|---|---|---|
| CN | 102077504 | 5/2011 |
| CN | 102257751 | 11/2011 |

(Continued)

OTHER PUBLICATIONS

European Patent Office Application Serial No. 15761486.8, Search Report dated Sep. 25, 2017, 9 pages.

(Continued)

*Primary Examiner* — Chi H Pham
*Assistant Examiner* — Fahmida S Chowdhury
(74) *Attorney, Agent, or Firm* — Lee Hong Degerman Kang & Waimey

(57) ABSTRACT

A method for a transmitting side transmitting a signal for low transmission latency in a wireless communication system, according to one embodiment of the present invention, comprises the steps of: mapping a signal to at least one subframe; and the transmitting side transmitting the signal to a receiving side. Here, the at least one subframe is a legacy subframe comprising L number of orthogonal frequency division multiplexing (OFDM) symbols, or an advanced subframe comprising N number of OFDM symbols, wherein (Continued)

the advanced subframe may be transmitted twice or more times within the transmission period of the legacy subframe.

13 Claims, 13 Drawing Sheets

(51) Int. Cl.
*H04L 27/26* (2006.01)
*H04J 11/00* (2006.01)
*H04W 72/14* (2009.01)
*H04W 72/04* (2009.01)
*H04W 72/08* (2009.01)

(52) U.S. Cl.
CPC .......... *H04L 5/0044* (2013.01); *H04L 5/0048* (2013.01); *H04L 5/0053* (2013.01); *H04L 5/0055* (2013.01); *H04L 5/0094* (2013.01); *H04L 27/2602* (2013.01); *H04L 27/2613* (2013.01); *H04W 72/0446* (2013.01); *H04W 72/085* (2013.01); *H04W 72/14* (2013.01); *H04W 72/0413* (2013.01)

(56) References Cited

U.S. PATENT DOCUMENTS

| | | | |
|---|---|---|---|
| 9,172,513 | B2 | 10/2015 | Gaal et al. |
| 2009/0046606 | A1 | 2/2009 | Wan et al. |
| 2009/0116427 | A1 | 5/2009 | Marks et al. |
| 2009/0219875 | A1 | 9/2009 | Kwak et al. |
| 2009/0323614 | A1* | 12/2009 | Wang .................. H04L 5/0048 370/329 |
| 2010/0260164 | A1 | 10/2010 | Moon et al. |
| 2011/0249633 | A1 | 10/2011 | Hong et al. |
| 2011/0255451 | A1 | 10/2011 | Moon et al. |
| 2011/0274081 | A1 | 11/2011 | Chun et al. |
| 2011/0310837 | A1 | 12/2011 | Classon et al. |
| 2011/0317682 | A1* | 12/2011 | Matsumura .......... H04L 5/0048 370/343 |
| 2012/0027123 | A1 | 2/2012 | Lee et al. |
| 2012/0099549 | A1 | 4/2012 | Imamura et al. |
| 2013/0034071 | A1* | 2/2013 | Lee .................. H04W 74/0866 370/329 |
| 2013/0051286 | A1 | 2/2013 | Schultz et al. |
| 2013/0156018 | A1* | 6/2013 | Kim .................. H04W 56/0045 370/338 |
| 2014/0334397 | A1 | 11/2014 | Chen et al. |
| 2016/0330003 | A1* | 11/2016 | Chung .................. H04L 5/0048 |

FOREIGN PATENT DOCUMENTS

| | | |
|---|---|---|
| CN | 104115535 | 10/2014 |
| EP | 2509380 | 10/2012 |
| KR | 10-2008-0002901 | 1/2008 |
| KR | 10-2012-0051706 | 5/2012 |
| KR | 10-2014-0018894 | 2/2014 |
| WO | 2009084925 | 7/2009 |
| WO | 2012165877 | 12/2012 |

OTHER PUBLICATIONS

European Patent Office Application Serial No. 15762421.4, Search Report dated Sep. 25, 2017, 7 pages.
U.S. Appl. No. 15/108,553, Office Action dated Dec. 15, 2017, 25 pages.
U.S. Appl. No. 15/039,006, Office Action dated Jan. 24, 2018, 21 pages.
China Telecom, "Discussion on multi-subframe scheduling," 3GPP TSG-RAN WG1 #72, R1-131137, Apr. 2013, 4 pages.
Samsung, "Considerations on Multi-Subframe Scheduling," 3GPP TSG-RAN WG1 #72, R1-131023, Apr. 2013, 3 pages.
HTC, "Discussion on TDD UL-DL Reconfiguration in TDD eIMTA Systems," 3GPP TSG-RAN WG1 #74, R1-133252, Aug. 2013, 6 pages.
PCT International Application No. PCT/KR2015/001981, Written Opinion of the International Searching Authority dated Jun. 4, 2015, 21 pages.
PCT International Application No. PCT/KR2015/001872, Written Opinion of the International Searching Authority dated May 21, 2015, 16 pages.
PCT International Application No. PCT/KR2015/001871, Written Opinion of the International Searching Authority dated May 27, 2015, 16 pages.

* cited by examiner

FIG. 7
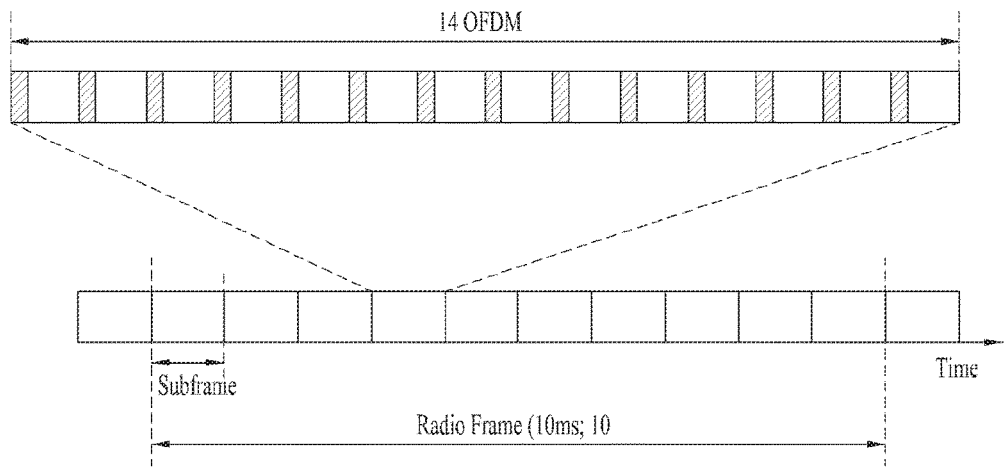
FIG. 8
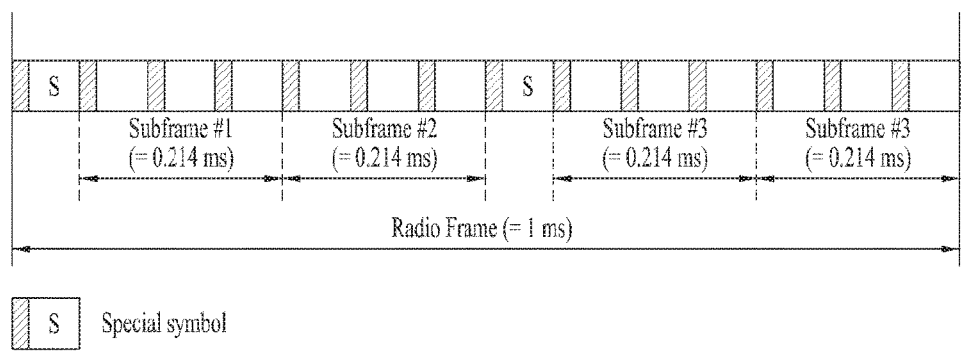
 Special symbol
FIG. 9
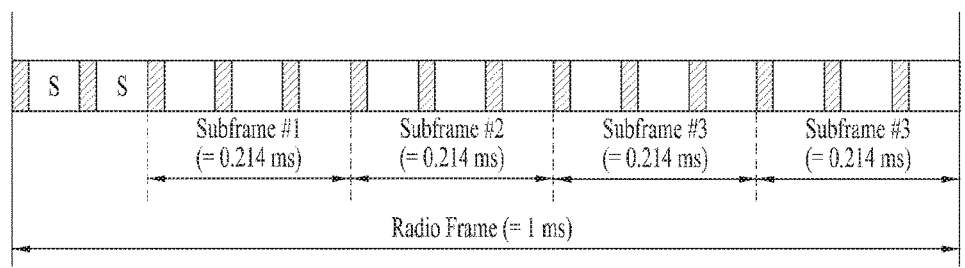
 Special symbol FIG. 12
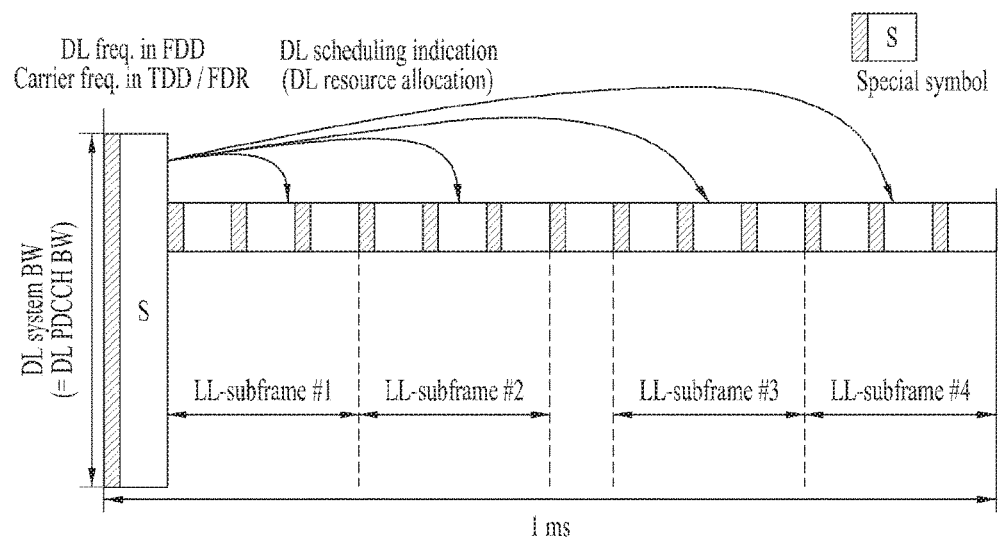
(a)
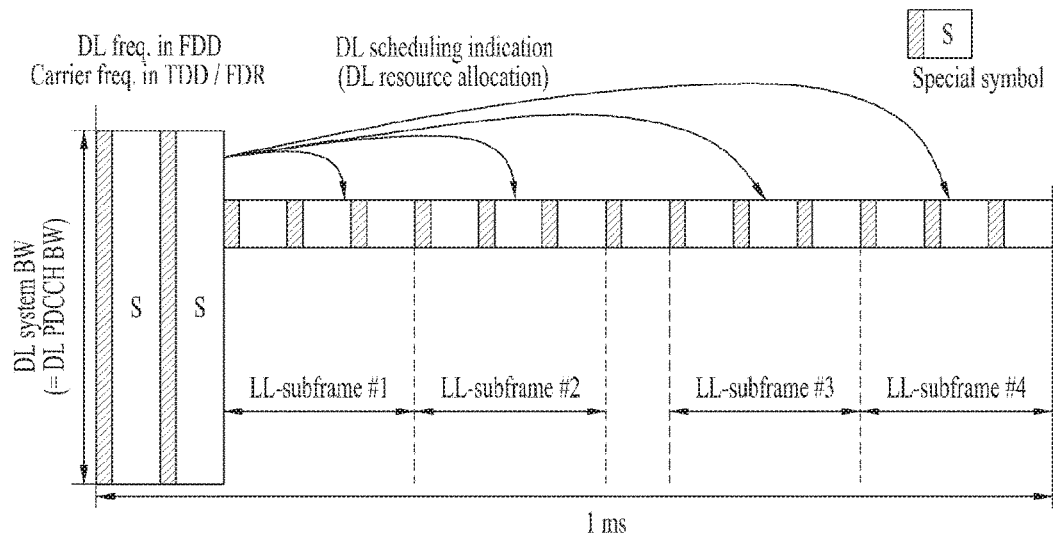
(b)

FIG. 14
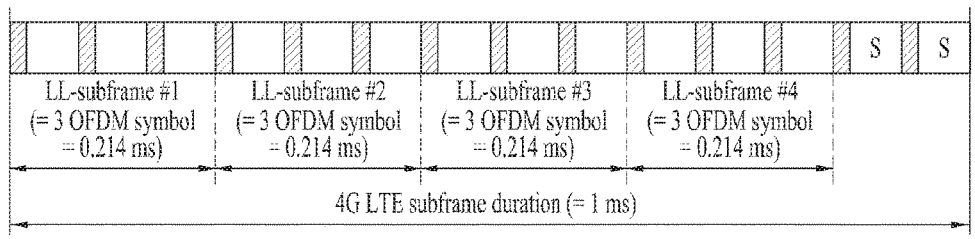
(a)
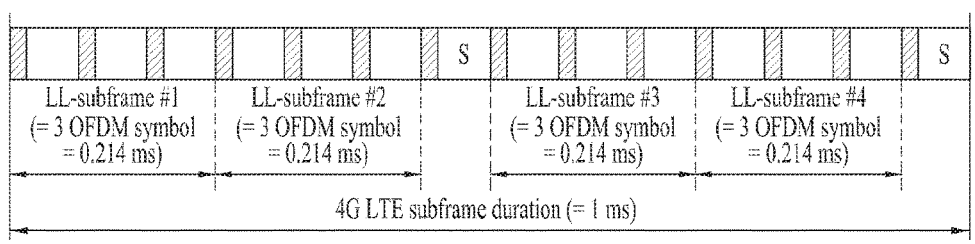
(b)
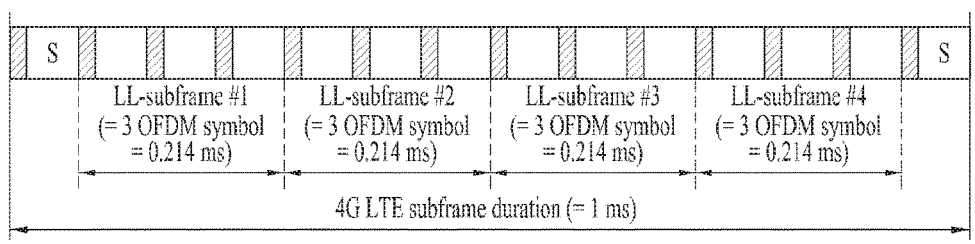
(c)
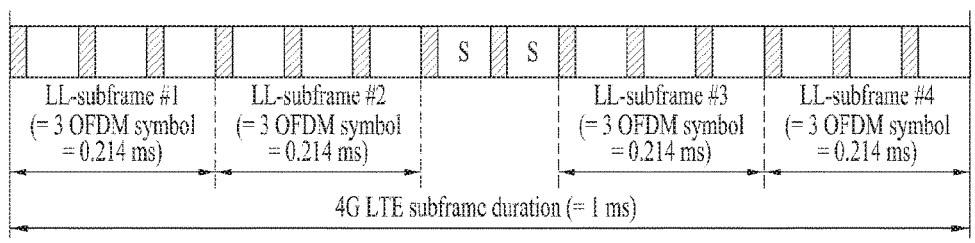
(d)

METHOD FOR TRANSMITTING AND RECEIVING SIGNAL FOR LOW LATENCY IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/001981, filed on Mar. 2, 2015, which claims the benefit of U.S. Provisional Application No. 61/952,150, filed on Mar. 13, 2014, the contents of which are all hereby incorporated by reference herein in their entirety.

TECHNICAL FIELD

The present invention relates to a wireless access system, and more particularly, to a method for transmitting and receiving a signal in a wireless communication system and an apparatus therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.). Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method for transmitting and receiving a signal in a wireless communication system and an apparatus therefor. Another object of the present invention is to provide a method for allocating resources to minimize latency. Still another object of the present invention is to provide a new resource structure to minimize latency. Further still another object of the present invention is to provide a method for efficiently performing downlink and uplink transmission and reception through the new resource structure.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to the embodiment of the present invention, a method for enabling a transmitting side to transmit a signal for low transmission latency in a wireless communication system comprises the steps of mapping a signal to at least one subframe; and the transmitting side transmitting the signal to a receiving side.

The method for enabling a transmitting side to transmit a signal for low transmission latency in a wireless communication system may further comprise the step of transmitting the signal through at least one special symbol.

According to another embodiment of the present invention, a method for enabling a receiving side to receive a signal for low transmission latency in a wireless communication system comprises the steps of receiving a signal from a transmitting side through at least one subframe; and decoding the received signal.

According to still another embodiment of the present invention, an apparatus for transmitting a signal for low transmission latency in a wireless communication system comprises a processor mapping a signal to at least one subframe; and a transmission module transmitting the signal.

According to further still another embodiment of the present invention, an apparatus for receiving a signal for low transmission latency in a wireless communication system comprises a receiving module receiving a signal through at least one subframe; and a processor decoding the received signal.

The followings may commonly be applied to the aforementioned embodiments.

The at least one subframe is a legacy subframe comprising L number of orthogonal frequency division multiplexing (OFDM) symbols, or an advanced subframe comprising N number of OFDM symbols, and the advanced subframe is transmitted twice or more times within a transmission slot of the legacy subframe.

Preferably, the advanced subframe is transmitted M times more than twice within the transmission slot of the legacy subframe based on the following Equation 1:

$$M = \lfloor L/N \rfloor. \qquad \text{<Equation 1>}$$

In this case, the number N of OFDM symbols included in the advanced subframe may be determined based on a transmission latency value. Preferably, the number N of OFDM symbols included in the advanced subframe may be determined based on the following Equation 2:

$$N = \left\lceil \frac{\text{legacy } OTA \text{ latency}}{\text{advanced } OTA \text{ latency}} \right\rceil, \qquad \text{< Equation 2 >}$$

where the advanced OTA (Over the Air) latency is an OTA latency value corresponding to a case where the at least one subframe is the advanced subframe, and the legacy latency is an OTA latency value corresponding to a case where the at least one subframe is the legacy subframe.

Preferably, N is 3.

Meanwhile, the special symbol may be transmitted separately from the advanced subframe within the transmission slot of the legacy subframe.

In this case, the special symbol may include information on configuration of the advanced subframe.

Meanwhile, a data channel may be transmitted through the advanced subframe, and a control channel may be transmitted through the special symbol.

Alternatively, the special symbol may be used for transmission of at least one of a downlink physical control channel, a downlink synchronization signal, a reference signal, and an ACK/NACK signal, or may be used for measurement of interference.

The special symbol may have a position varied based on its purpose of use.

Meanwhile, a slot of the one subframe corresponds to one transmission time interval (TTI).

The aforementioned description of the present invention and detailed description, which will be described later, are only exemplary, and are intended for additional description of the invention cited in claims.

Advantageous Effects

According to the present invention, a method for transmitting and receiving a signal to minimize latency in a wireless communication system is provided. In more detail, a new resource structure is provided, and a method for allocating resources by using the new resource structure is provided, whereby a user equipment can normally and efficiently transmit and receive a physical channel.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 7 is a diagram illustrating a transmission resource structure in a 3GPP LTE system;

FIG. 8 is a diagram illustrating a transmission resource structure according to one embodiment of the present invention;

FIG. 9 is a diagram illustrating positions of special symbols as one example of a resource structure applied to the present invention;

FIG. 12 is a diagram illustrating a method for using special symbols in downlink transmission as one embodiment of the present invention;

FIG. 14 is a diagram illustrating a method for using special symbols in uplink transmission as other embodiment of the present invention;

BEST MODE FOR CARRYING OUT THE INVENTION

Figure 1:
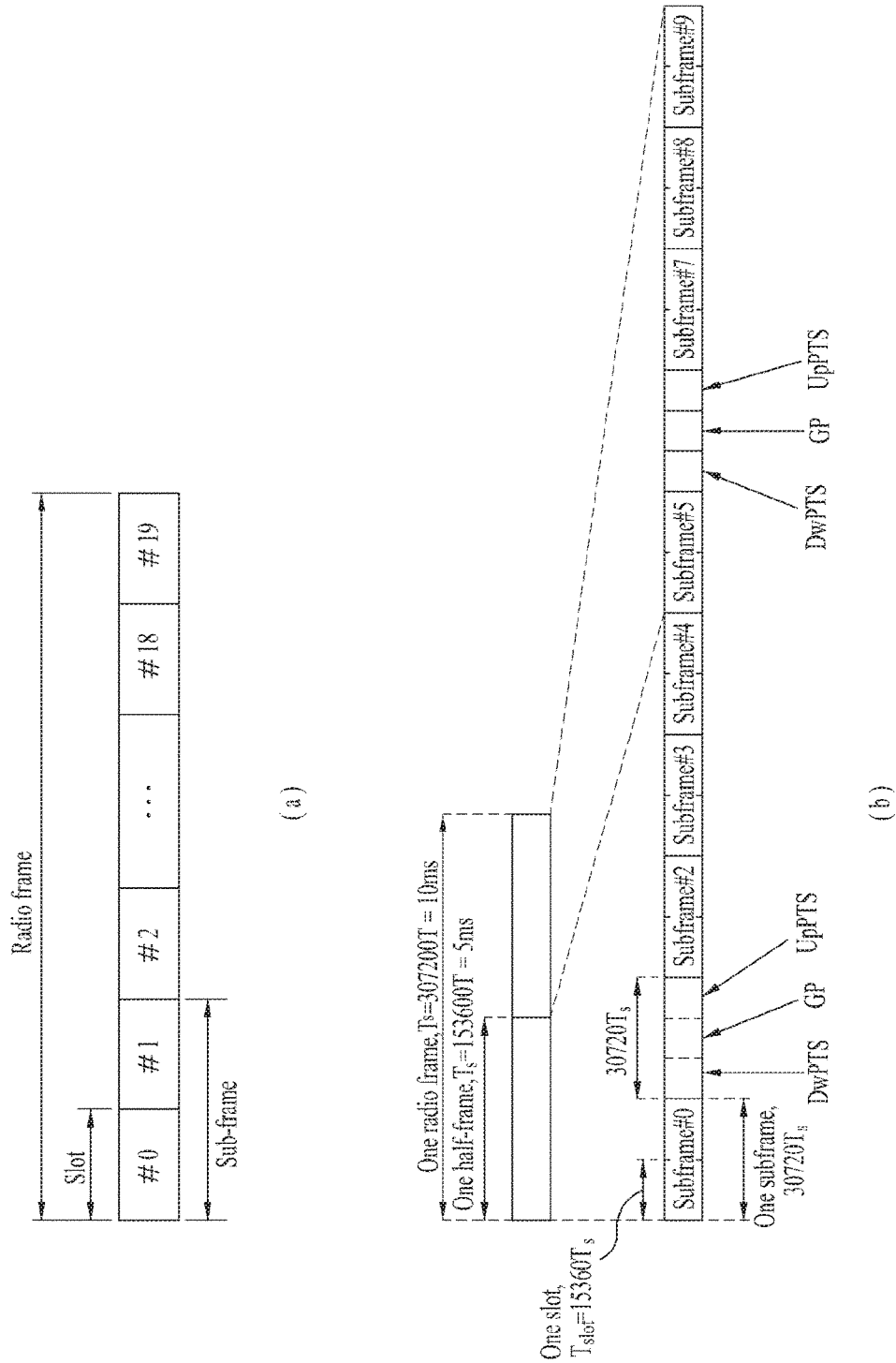
FIG. 1 is a diagram illustrating a structure of a radio frame.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed based on a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

Radio Frame Structure

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1(a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP.

In case of the extended CP, for instance, the number of OFDM symbols included in one slot may be 6. If a channel status is unstable (e.g., a UE is moving at high speed), it may be able to use the extended CP to further reduce the inter-symbol interference.

FIG. 1(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The radio frame may be configured differently depending on a duplex mode. In a frequency division duplex (FDD) mode, downlink transmission and uplink transmission may be identified from each other by frequency, whereby the radio frame includes only one of the downlink subframe and the uplink subframe in a specific frequency band. In a time division duplex (TDD) mode, downlink transmission and uplink transmission may be identified from each other by time, whereby the radio frame includes both the downlink subframe and the uplink subframe in a specific frequency band.

Particularly, FIG. 1(b) illustrates a structure of a radio frame for TDD, which is used in a 3GPP LTE(-A) system. Table 1 illustrates uplink-downlink configuration of subframes within the radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D represents a downlink subframe, U represents an uplink subframe, and S represents a special subframe. The special subframe includes a downlink pilot time slot (DwPTS), a guard period (GP), and an uplink pilot time slot (UpPTS). The DwPTS is a time period reserved for downlink transmission, and the UpPTS is a time period reserved for uplink transmission. Table 2 illustrates a configuration of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described structures of the radio frame are exemplary only. And, the number of subframes included in a radio frame, the number of slots included in the subframe and the number of symbols included in the slot may be modified in various ways.

Figure 2:
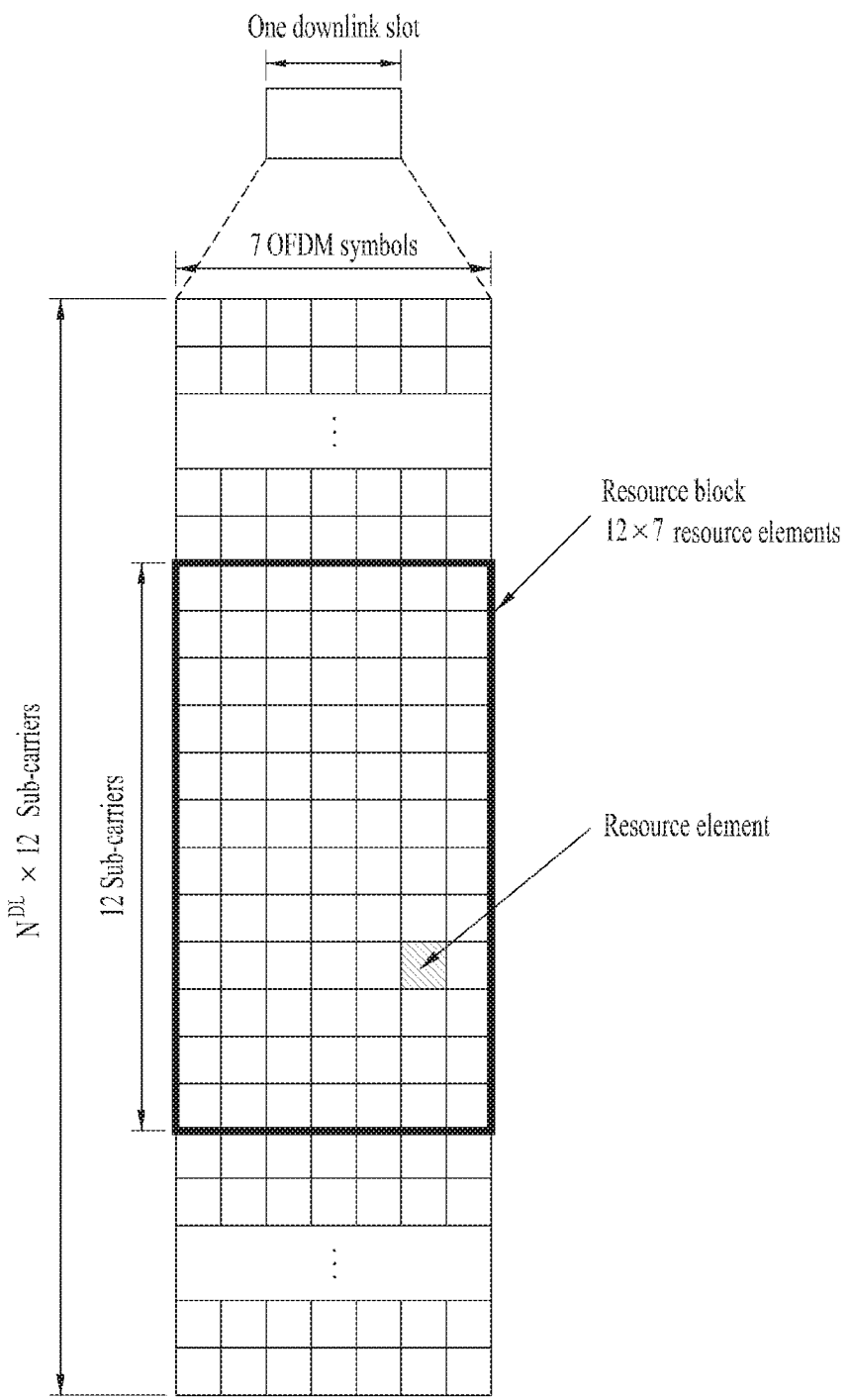
FIG. 2 is a diagram illustrating a resource grid at a downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Downlink Subframe Structure

Figure 3:
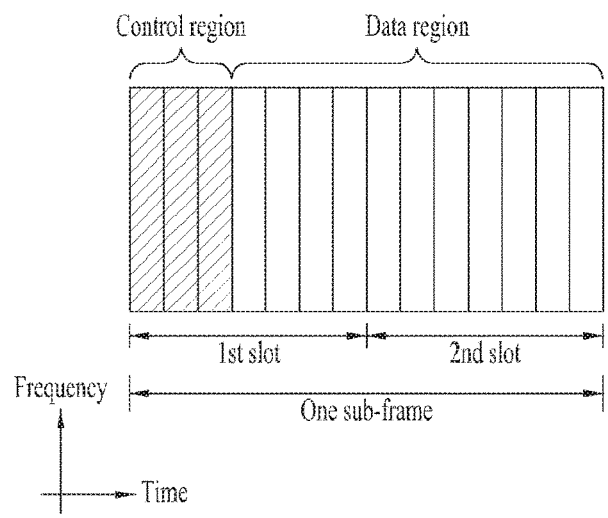
FIG. 3 is a diagram illustrating a structure of a downlink subframe.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group.

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

PDCCH Processing

When PDCCHs are mapped to REs, control channel elements (CCEs) corresponding to contiguous logical allocation units are used. A CCE includes a plurality of (e.g. 9) REGs and an REG includes 4 neighboring REs except for a reference signal (RS).

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 3.

TABLE 3

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 4.

TABLE 4

| | Search space | | The number |
|---|---|---|---|
| | Aggregation level | Size (CCE unit) | of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, the UE has a plurality of search spaces at each aggregation level because 4 aggregation levels are present. The search spaces may be divided into a UE-specific search space (USS) and a common search space (CSS), as shown in Table 2. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The UE attempts to decode a search space, as described above. The number of decoding attempts is determined by DCI format and transmission mode determined through RRC signaling. When carrier aggregation (CA) is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation (CA) is not applied.

Enhanced Control Channel (E-PDCCH)

Enhanced-PDCCH (E-PDCCH) will hereinafter be described as a representative example of an enhanced control channel.

While control information included in the above-described DCI formats is transmitted through a PDCCH defined in LTE/LTE-A in the above description, the control information can also be transmitted through a downlink control channel other than the PDCCH, for example, an enhanced PDCCH (E-PDCCH). The E-PDCCH is an extended form of a control channel carrying DCI for a UE and may be used to effectively support inter-cell interference control (ICIC), CoMP, MU-MIMO, etc.

The E-PDCCH is discriminated from the PDCCH in that the e-PDCCH and R-PDCCH are allocated to time-frequency resource regions (e.g., a data region of FIG. 3) other than regions (e.g., a control region of FIG. 3) defined for PDCCH transmission in LTE-LTE-A. In order to discriminate between a conventional PDCCH and E-PDCCH, the conventional PDCCH is referred to as a legacy PDCCH. For example, resource element (RE) mapping of E-PDCCH may indicate that REs of E-PDCCH are mapped to the remaining OFDM symbols other than initial N OFDM symbols (e.g., N≤4) of a downlink subframe in a time domain, and are also mapped to a set of semi-statically allocated resource blocks (RBs) in a frequency domain.

Similar to the reason of E-PDCCH introduction, E-PHICH may be defined as a new control channel carrying HARQ ACK/NACK information regarding uplink (UL) transmission, and E-PCFICH may be defined as a new control channel carrying information of a resource region used for transmission of a DL control channel. E-PDCCH, E-PHICH and/or E-PCFICH may be commonly referred to as enhanced-control channel(s).

Enhanced REG (EREG) may be used to define the Enhanced-control channel(s)-to-RE(s) mapping operation. For example, 16 EREGs (i.e., EREG 0 to EREG 15) may be present in one PRB pair. The remaining REs other than REs that are mapped to demodulation reference signal (DMRS) on a single PRB are numbered from 0 to 15. The numbering order may first be based on the frequency increasing order, and then based on the time increasing order. For example, REs indexed with 'i' may construct one EREG i.

Enhanced control channel (e.g., E-PDCCH) may be transmitted using an aggregation of one or more enhanced CCEs (ECCEs). Each ECCE may include one or more EREGs. The number of EREGs per ECCE may be, for example, 4 or 7. In case of a normal subframe of a normal CP, the number of EREGs per ECCE may be set to 4.

ECCEs available in E-PDCCH may be numbered from 0 to $N_{ECCE}-1$. For example, $N_{ECCE}$ may be set to 1, 2, 4, 8, 16 or 32.

The number of REs of a PRB pair configured to transmit the E-PDCCH may be defined as the number of REs satisfying the following conditions i), ii) and iii). The first condition (i) is that REs should be a part of one of 16 EREGs of a PRB pair. The second condition (ii) is that REs need not be used for Cell-specific Reference Signal (CRS) or Channel State Information-Reference Signal (CSI-RS). The third condition (iii) is that REs need to belong to OFDM symbols having an index higher than that of a start OFDM symbol at which E-PDCCH starts.

In addition, E-PDCCH may be mapped to REs in different ways according to the localized scheme and the distributed scheme. E-PDCCH may be mapped to REs configured to satisfy the following conditions a) to d). The first condition (a) means that REs should be a part of EREG allocated for transmission. The second condition (b) means that REs should not be a part of a PRB pair used to transmit a PBCH (Physical Broadcast Channel) or synchronization signal. The third condition (c) means that REs need not be used for CRS or CSI-RS of a specific UE. The fourth condition (d) means that REs should belong to OFDM symbols having an index higher than that of a start OFDM symbol at which E-PDCCH starts.

E-PDCCH allocation may be carried out as follows. One or more E-PDCCH-PRB sets may be established for a UE through higher layer signaling from a BS or eNB. For example, the E-PDCCH-PRB set for use in the case of E-PDCCH may be used to monitor the E-PDCCH.

In addition, cross interleaving may or may not be applied to RE mapping of the E-PDCCH.

If cross interleaving is not applied, one E-PDCCCH may be mapped to a specific set of RBs, and the number of RBs constructing the RB set may correspond to an aggregation level 1, 2, 4 or 8. In addition, other E-PDCCH may not be transmitted through the corresponding RB set.

If cross interleaving is applied, plural E-PDCCHs are simultaneously multiplexed and interleaved, the E-PDCCHs may be mapped to RBs allocated for transmission of the E-PDCCH. That is, the above-mentioned E-PDCCH-to-RB mapping may also indicate that plural E-PDCCHs are simultaneously mapped to a specific RB set.

DCI Format 1A

DCI format 1A may refer to a DCI format used for compact scheduling of one PDSCH codeword within one cell. In other words, DCI format 1A may include a variety of control information used in single-antenna transmission, single-stream transmission, or Tx diversity transmission, etc. Table 5 and Table 6 show examples of DCI format 1A defined in 3GPP LTE/LTE-A.

TABLE 5

| Carrier Indicator | 0 or 3 bits |
| --- | --- |
| Flag for format 0/format 1A differentiation | 1 bit |
| Localized/Distributed VRB assignment Flag | 1 bit |
| Resource Block Assignment | N bits |
| Modulation and coding scheme | 5 bits |
| HARQ process number | 3 bits(FDD), 4 bits(TDD) |
| New Data Indicator | 1 bit |
| Redundancy Version | 2 bits |
| TPC(Transmit Power Control) command for PUCCH | 2 bits |
| Downlink Assignment Index | 0 bit(FDD), 2 bits(TDD) |
| SRS(Sounding Reference Signal) request | 0 or 1 bit |

DCI format 1A including control information of Table 5 may be transferred from a BS (or eNB) to a UE through PDCCH or E-PDCCH.

DCI format 1A includes information that is capable of scheduling the most basic downlink transmission (i.e., one PDSCH codeword transmission at Rank 1). Accordingly, if a complicated PDSCH transmission scheme, such as transmission of at least Rank-2 and/or transmission of multiple codewords, is incorrectly performed, DCI format 1A may be used to support the most basic PDSCH transmission scheme (i.e., a fallback usage).

Uplink (UL) Subframe Structure

Figure 4:
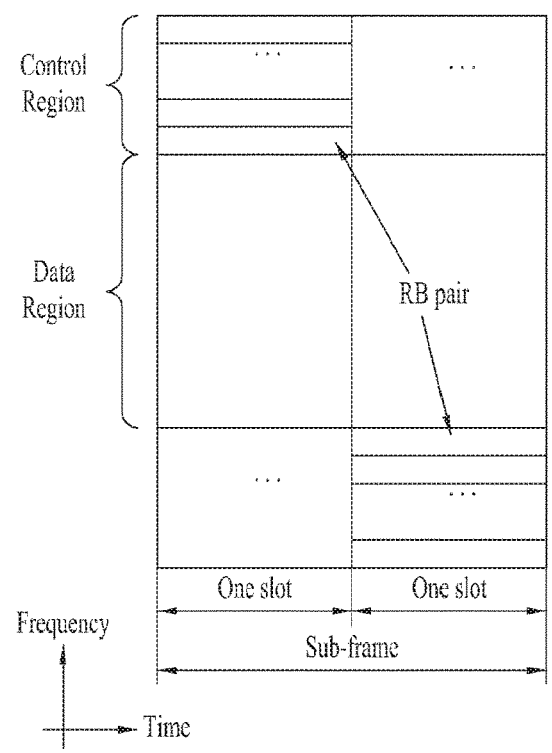
FIG. 4 is a diagram illustrating a structure of an uplink subframe.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference of radio transmission and reception latency in a communication system in view of downlink transmission and reception in the 3GPP LTE system will be described with reference to FIG. 5 below.

Figure 5:
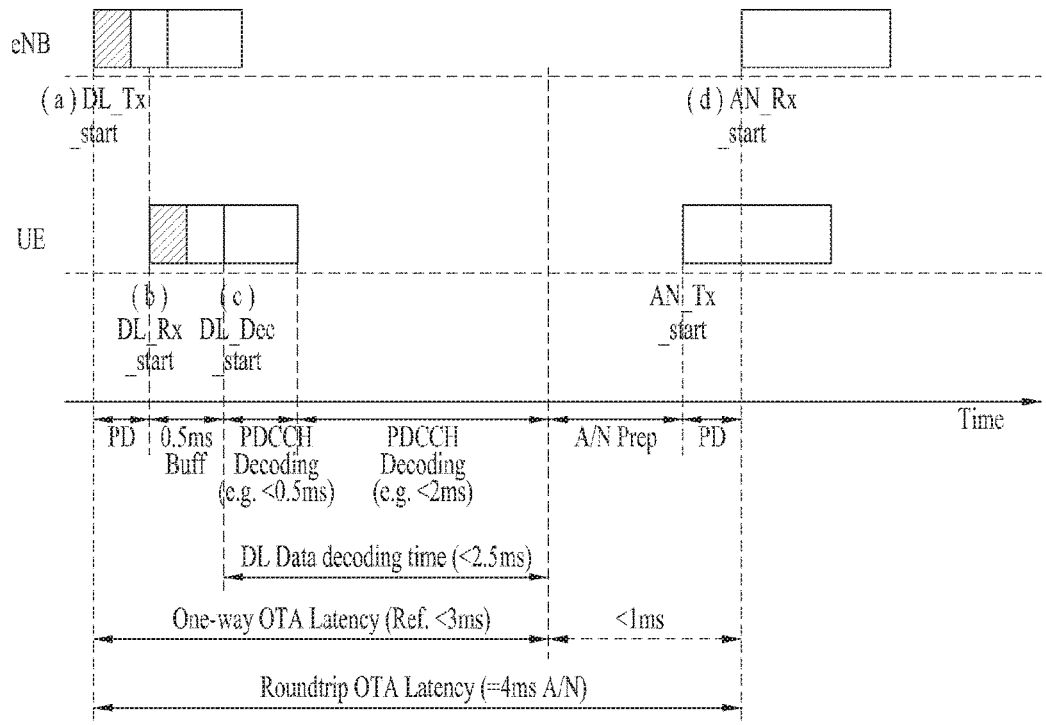
FIG. 5 is a diagram illustrating reference of transmission and reception latency in case of downlink transmission and reception of a 3GPP LTE system.

In FIG. 5, it is assumed that a downlink signal is transmitted from a random base station. The base station starts transmission a downlink signal at a point (a) of FIG. 5. The downlink transmission signal is subjected to propagation delay (PD), and starts to be received by a random UE at a point (b). In this case, the UE performs processing for the received signal. For example, the UE buffers (0.5 ms Buff) the received signal in a signal storage memory at a length of one slot and decodes a PDCCH from a received starting point (point (c) of FIG. 5) of a second slot of 0.5 ms within a subframe and completes decoding of the PDCCH to reach a received end point of the second slot.

Immediately after decoding of the PDCCH is completed, if it is identified that there is a received PDSCH, the UE decodes the PDSCH in accordance with a format indicated by the PDCCH. The UE performs decoding of the PDSCH at a level less than 2 ms from a starting point to an end point. The UE configures the decoding result as ACK/NACK information and is ready to transmit the configured information, and defines latency, which is required by a starting point (point (d) of FIG. 5) where the base station receives the information, within 1 ms.

The time from a timing point for transmitting a downlink signal from a base station to a PDSCH decoding end point is defined as "one-way OTA (Over-The-Air) latency", and reference is defined that one-way OTA latency is performed within 3 ms.

Latency from the time when the base station starts data transmission to the time when the base station receives ACK/NACK transmission of a radio UE on the 3GPP LTE system is defined as "Roundtrip OTA latency" and reference is defined that roundtrip OTA latency is performed within 4 ms. "Roundtrip OTA latency" may be referred to as "ACK/NACK (A/N) RTT (Round Trip Time)".

Another value except "Roundtrip OTA latency" may be applied to the radio transmission and reception latency reference in accordance with implementation of a UE modem.

Meanwhile, in order that "one-way OTA (Over-The-Air) latency" or "Roundtrip OTA latency" is limited to 1 ms or less based on the reference described in FIG. 5, the following requirements for each element which is performed should be satisfied. Hereinafter, the requirements will be illustrated in view of downlink transmission and reception.

Figure 6:
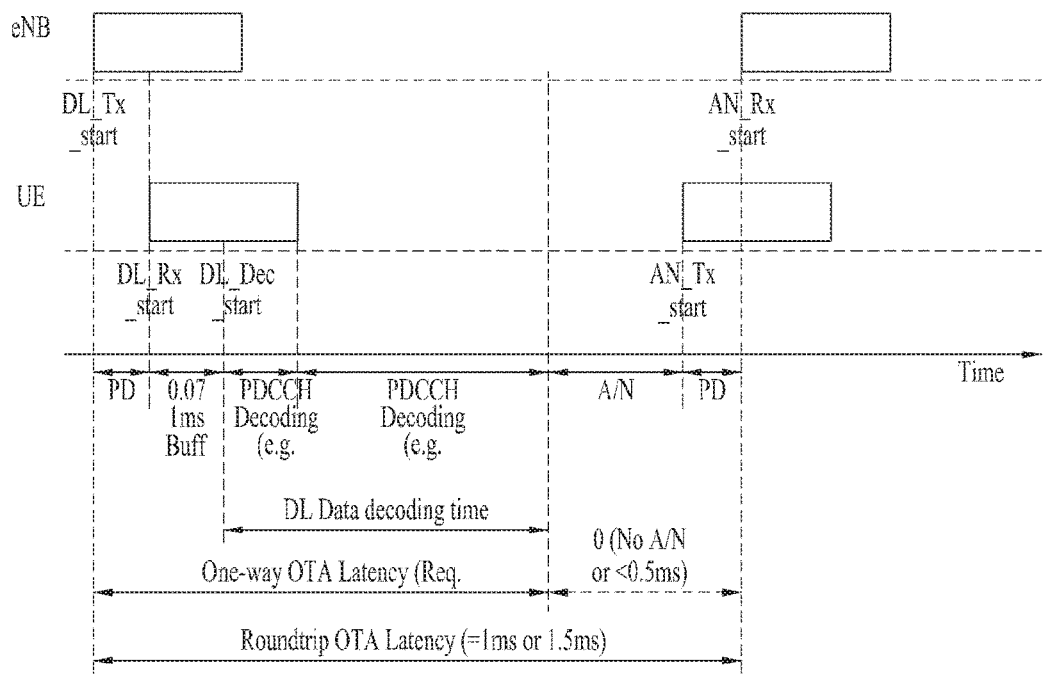
FIG. 6 is a diagram illustrating latency reference of downlink transmission and reception according to one embodiment of the present invention.

FIG. 6 is a diagram illustrating latency reference of downlink transmission and reception latency according to one embodiment of the present invention.

Latency reference of transmission and reception in view of One-way OTA and Roundtrip OTA latency will be described with reference to FIG. 6.

Referring to FIG. 6, in view of One-way OTA, in order that radio transmission and reception latency is adjusted to total 1 ms or less, it is required to restrict a buffering period and decoding time required for a downlink signal transmitted from the base station and then received by the UE through propagation delay (PD). In more detail, it is required to configure one OFDM symbol slot sample buffering (0.071 ms Buff) period, and latency required for PDCCH decoding and latency required for PDSCH decoding are respectively reduced as much as ¼ and ⅕ as compared with FIG. 5.

Referring to FIG. 6, in view of Roundtrip OTA latency, in order that radio transmission and reception latency is adjusted to total 1 ms or less, latency caused by ACK/NACK transmission should be excluded. If ACK/NACK transmission is applied, total latency of 1.5 ms may be set as a target value.

As illustrated in FIG. 6, in order that "one-way OTA (Over-The-Air) latency" or "Roundtrip OTA latency" is limited to 1 ms or less, the following requirements should be satisfied.

(1) PDSCH decoding latency reduction: in order to restrict a receiving processing event of a symbol unit and restrict a data information size which is a target of channel decoding, a time slot size of a transmit time interval (TTI) or subframe which is a unit scheduled by a packet scheduler.

(2) PDCCH decoding latency reduction: in order to quickly define PDCCH decoding latency and PDSCH decoding start timing point subsequent to the PDCCH decoding latency, PDCCH transmission symbols may be restricted or scheduling information of a plurality of downlink data transmission subframes may be transferred through a random UE-specific PDCCH.

(3) Exclusion of UE ACK/NACK transmission: ACK/NACK transmission is excluded in accordance with the condition that the probability of error in downlink data transmission is sufficient by Automatic Repeat reQuest (ARQ) processing only on a Layer 2 through enhancement of downlink network radio node transmission performance and enhancement of UE downlink signal reception performance, whereby "Roundtrip OTA latency" can be reduced at 0.5 ms or more.

Among the aforementioned methods for low latency, a new time slot transmission resource structure is suggested for (1) PDSCH channel decoding latency reduction and (2) PDCCH decoding latency reduction, and a time slot transmission resource structure intended for interworking with the legacy 3GPP LTE frame structure within a random FFT/IFFT size will be described.

Hereinafter, a fully flexible UE-specific TDD (F2 UE-specific TDD) scheme is suggested to increase efficiency in use of a frequency band and more actively support differential uplink-downlink data asymmetry based on service and application of user unit, and a method for efficiently implementing and using full-duplex radio for simultaneous transmission and reception within a single frequency band will be described.

First of all, a transmission resource structure according to the present invention will be described.

FIG. 7 is a diagram illustrating a transmission resource structure in a 3GPP LTE system.

As illustrated above, in case of normal cyclic prefix (CP) in the 3GPP LTE system, 14 continuous OFDM symbols are designated by one transmission unit, and this will be defined as a subframe. At this time, the subframe has a length of 1 ms, and the LTE system performs user specific transmission data packet scheduling in a unit of 1 ms subframe and defines such user specific transmission data packet scheduling by means of a transmit time interval (TTI). A unit of the TTI becomes a subframe of 1 ms. 10 of such subframes are grouped and then defined as a radio frame, and a length of a full radio frame becomes 10 ms.

FIG. 8 is a diagram illustrating a transmission resource structure according to one embodiment of the present invention.

The present invention suggests new transmission resource structure different from that of the legacy subframe with reference to FIG. 8. In the present invention, a subframe comprised of N number (N≥1) of OFDM symbols is defined. Also, M number of subframes comprised of N number of OFDM symbols and P number of special symbols (SS) for a control physical signal or a control information transmission channel are grouped to define a random radio frame structure.

In this case, the number of repeated times M of the new subframe within a legacy subframe transmission slot may be determined based on the following Equation 1.

$$M = \left\lceil \frac{L}{N} \right\rceil. \quad \text{[Equation 1]}$$

In the Equation 1, L is the number of OFDM symbols of the legacy subframe, and N is the number of OFDM symbols included in the new subframe.

In this case, data may be transmitted through subframes, and a physical channel or a physical signal for control, which is intended for control information transmission different from data transmission, may be transmitted through special symbols. This new time slot resource transmission structure may be designated as a user specific transmission structure specified in a user unit. Alternatively, the new time slot resource transmission structure may be designated as a common transmission structure configured to be applied to entire users of a cell or system. Moreover, the resource transmission structure may be configured to be restrictively applied depending on time.

If the resource transmission structure is the user common transmission structure, for designation of a base station or network level, the resource transmission structure may be indicated to the UE through user common PDCCH or user common RRC signaling by using system information. On the contrary, if the resource transmission structure is the user specific transmission structure, the resource transmission structure may be indicated to the UE through user specific PDCCH or user specific RRC signaling.

In FIG. 8, it is assumed that N=3 and N=4 as one example of the resource structure applied to the present invention. That is, the resource structure according to FIG. 8 is defined that one subframe is comprised of 3 (=N) OFDM symbols and a radio frame of 1 ms length includes 4 (=M) subframes and 2 (=P) special symbols.

At this time, special symbols within the radio frame may be designed to be located at constant intervals within the radio frame or on a plurality of radio frames in accordance with a purpose of use for transmission of a physical signal intended for measurement, detection or information transfer. Also, a plurality of special symbols may be designed to be continuously located at a special position within the radio frame in accordance with features of information or signal, which is desired to be transmitted. Individual special symbols may be designed to be located on the radio frame at an irregular period.

Figure 10:
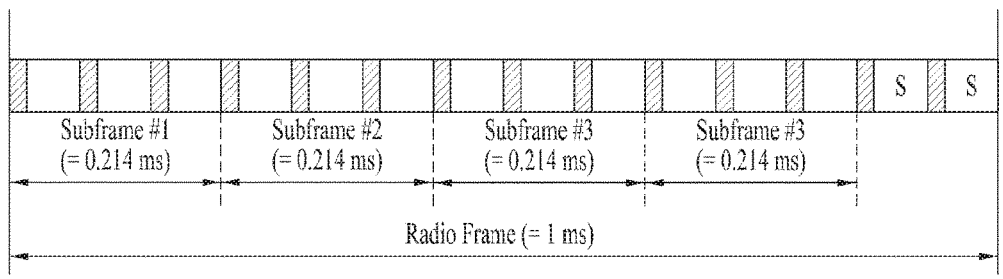
FIG. 10 is a diagram illustrating positions of special symbols as another example of a resource structure applied to the present invention.

FIGS. 9 and 10 illustrate positions of special symbols in one example of a resource structure applied to the present invention.

Referring to FIG. 9, a resource structure where two special symbols are continuously arranged at the first position on the radio frame will be suggested as a resource structure applied to the present invention.

Referring to FIG. 10, a resource structure where two special symbols are continuously arranged at the last position on the radio frame will be suggested as a resource structure applied to the present invention.

The special symbols on the time slot transmission resource structure suggested in the present invention can be arranged in a unit of radio frame or special radio frame sets based on a special status (for example, ACK/NACK transmission, reference signal transmission, etc.) given to each radio frame.

In order to notify the UE of the position of the special symbols, the following methods can be used. If the position of special symbols per radio frame has periodicity in a unit of a specific length, index per pattern may be given to a pattern of the position of the special symbols within the corresponding period. Also, a control information parameter in the form of a bit-map of a radio frame unit may be used. The base station may transmit the parameter or index to the UE through RRC signaling, may transmit the parameter or index to the UE through a downlink physical data channel by using a MAC control element (CE), or may transmit the parameter or index to the UE through a PDCCH.

Meanwhile, the new time slot transmission resource structure suggested in the present invention may be designated as the user specific transmission structure specified in a user unit in the frequency division duplex (FDD) mode, or may be designated as the common transmission structure applied to entire users of the cell. Also, the new time slot transmission resource structure may be applied to either both a downlink transmission band and an uplink transmission band or only one of them.

Likewise, in a TDD mode or a full duplex mode which uses a specific radio resource in uplink and downlink transmission, the new time slot transmission resource structure may be designated as the user specific transmission structure specified in a unit of user or the common transmission structure applied to entire users of the cell. Also, the new time slot transmission resource structure may be applied to either both time resources during downlink transmission and time resources during uplink transmission or only one of them with respect to the specific transmission structure or the common transmission structure.

In view of downlink-uplink time slot resource configuration on the TDD system, downlink transmission resources and uplink transmission resources as illustrated in FIGS. 8 to 10 may be designated in a unit of a radio frame or a subframe within the radio frame. That is, the time slot transmission resource structure suggested in the present invention may independently be applied to the uplink transmission resources and the downlink transmission resources by using independent parameters. The independent parameters may be transmitted through a physical control channel or RRC signaling. Meanwhile, the time slot transmission resource structure may simultaneously be applied to both the uplink transmission resources and the downlink transmission resources in accordance with an application mode of the system. In this case, the time slot transmission resource structure may commonly be applied to the uplink transmission resources and the downlink transmission resources by using one parameter, wherein the one parameter may be transferred to the UE through the physical control channel or RRC signaling.

Hereinafter, a method for using the special symbols will be described.

The time slot transmission resource structure suggested in the present invention is defined that special symbols are included in the radio frame separately from the subframe. In this case, the special symbols may be used to transmit special cell common control information or user specific control information or transmit a special cell common physical signal or user specific physical signal (pilot, reference signal, synchronization signal, etc.), which is intended for measurement or detection of the UE.

Hereinafter, embodiments (control information transmitted using special symbols or signal that can be transmitted) that relate to the use of special symbols will be described for each case of a downlink and an uplink.

Use of Special Symbols in Downlink (1) PDCCH transmission: the base station may transmit a PDCCH to the UE through special symbols, and the UE may receive a physical channel intended by the corresponding symbols. In this case, the PDCCH may include user common control information or user specific control information, which should be transmitted from the base station or random network radio node to the UE through a downlink. At this time, the PDCCH which is used may be designed on a frequency resource on one special symbol. If a plurality of special symbols are used, the PDCCH may be designed on a plurality of symbol resources and frequency resources.

(2) Downlink synchronization signal transmission: the base station may transmit downlink synchronization physical signals through one or more special symbols to acquire downlink receiving synchronization of the UE. The downlink synchronization physical signals may be a primary synchronization signal (PSS) and a secondary synchronization signal (SSS) in the 3GPP LTE system. If this method is used, a position of special symbols used for synchronization signal transmission within a random radio frame on a time slot transmission resource may be designated user-commonly. In this case, the position of the special symbols may be designated permanently by the base station and the UE without separate signaling.

(3) Downlink channel measurement pilot (or reference signal) transmission: the base station may transmit a downlink channel measurement pilot through special symbols. In more detail, the downlink channel measurement pilot may be transmitted through one or more special symbols defined separately from a user data channel transmission slot for the purpose of controlling a system downlink that includes packet scheduler time-frequency resource configuration adaptive to a radio channel on a radio packet transmission system and support of determination of a transmission mode. The UE may perform radio channel measurement by using the corresponding pilot through the corresponding special symbols.

If techniques for performing downlink transmission by using a plurality of transmitting antennas such as massive MIMO antennas are applied to a mobile communication system in the future, a case where legacy data channel transmission target resources are excessively used for pilot signal transmission may occur. The above method may be used as a method for avoiding data transmission performance deterioration caused by excessive pilot use. If the downlink channel measurement pilot is transmitted using a plurality of special symbols, a method for multiplexing multiple pilot resource patterns of basic TDM and FDM modes may be used. In addition, a method for multiplexing multiple pilot resource patterns of a CDM mode based on time slot orthogonal code application or frequency slot orthogonal code application may be used.

(4) Use of interference signal measurement of UE: the base station may define special symbols to allow the UE to measure an interference signal. The UE may measure a downlink receiving interference signal generated with another network radio node or another UE in addition to a network radio node (or base station) served by the UE through one or more special symbols.

For example, the UE served through a random network node may use a method for receiving special signals (pilots or reference signals) of neighboring network radio nodes (or base stations) through the corresponding symbols. To this end, the corresponding network radio nodes (or base stations) may exclude transmission of radio signals from all subcarrier resources or partially designated subcarrier resources at special symbols on the time slot transmission resource used for transmission. In this case, the signals transmitted from the special symbols on the plurality of network radio nodes may be designated as downlink channel measurement pilots (or reference signals), and all the subcarrier resources within a specific pilot pattern or the corresponding symbol may specially be defined as null power pilots to exclude radio signal transmission. That is, a transmission power at all the subcarrier resources within the specific pilot pattern or the corresponding symbol may be set to 0 to exclude radio signal transmission.

For another example, in a state that a network radio node that serves the UE transmits a signal by using a specific resource pattern of a specific channel specific pilot (or reference signal), the UE may perform an interference measurement operation.

(5) Downlink ACK/NACK signal transmission for uplink data transmission: a downlink acknowledgement/non-acknowledgement (ACK/NACK) signal for uplink data transmission may be defined as a physical channel on a random special symbol. A system physical layer error detection correction mechanism operation may be defined such that an uplink data receiving network radio node (or base station) may transmit a downlink ACK/NACK signal through the corresponding special symbol and a UE that has transmitted uplink data may receive the ACK/NACK signal through the corresponding special symbol.

(6) Downlink massive MIMO beam scanning signal transmission: if a massive MIMO downlink transmission scheme is also applied to a radio network node (or base station) to which the time slot transmission resource structure suggested in the present invention is applied, the network radio node (or base station) may transmit a signature, pilot or reference signal for supporting user beam tracking of massive MIMO through a special signal at a certain period. The UE may perform an operation for detecting the received signal through the corresponding special symbol.

Use of Special Symbols in Uplink (1) Uplink synchronization signal transmission: if the new time slot transmission resource structure according to the present invention is applied to an uplink transmission frame structure, an uplink synchronization signal (for example, PRACH preamble in the 3GPP LTE) of the UE can be transmitted at one special symbol length or a plurality of special symbol lengths.

(2) Uplink channel sounding signal transmission: if an uplink channel sounding signal of the UE may be transmitted through special symbols on the new time slot transmission resource structure according to the present invention. If the base station indicates transmission of the uplink channel sounding signal, the base station may trigger the channel sounding signal by adding a channel sounding transmission indicator to user specific uplink data transmission grant PDCCH at a random time prior to the corresponding special symbol as much as a predetermined length. Alternatively, the network may notify a transmission time of the channel sounding signal through a higher layer signal (for example, RRC signaling) to support a more flexible operation. In this case, the predetermined length may be designated in a unit of a radio frame or subframe. Meanwhile, in case of periodic channel sounding signal transmission, a transmission time of a channel sounding signal may be designated using a parameter through RRC signaling. For the above two methods, timing of user specific channel sounding signal transmission attempt and resource configuration may previously be notified to the UE by using the parameter. In this case, the timing and resource configuration may be designated and notified by the parameter.

(3) Uplink physical control channel transmission: uplink control information of a random UE may be transmitted using an uplink physical control channel transmitted through one or a plurality of special symbols. In this case, uplink control information of the UE, which may be transmitted on the special symbols, may be defined as follows:

uplink scheduling request information according to UE transmission buffer status change (data arrival);

downlink channel measurement information of the UE; and

ACK/NACK information for downlink data reception of the UE.

A type of the uplink physical control channel transmitted through one or a plurality of special symbols may be designated considering request information (that is, bit size) of the aforementioned uplink control information.

Hereinafter, as methods for designating the type of the uplink physical control channel, the following methods will be suggested.

Method 1: one uplink physical control channel that supports error occurrence restriction requirements required for each information on a bit size of uplink control information of a broad range may be defined and applied to each control information case.

Method 2: for a case where a great gap between a bit size of individual uplink control information and required error occurrence restriction requirements is defined, individual uplink physical control channels that support maximum possible control information bit size of corresponding information and error requirements may be defined per control information and transmitted through one or a plurality of special symbols.

(5) Use of interference signal measurement of UE: the base station may measure an uplink receiving interference signal of another base station or the UE through one or more special symbols. The UE may measure a downlink receiving interference signal generated with another base station other than the base station served by the UE or another UE through one or more special symbols.

For example, a plurality of random UEs or a random base station may transmit a special pilot (or reference signal or signature) intended for interference measurement by using one or more special symbols. In this case, the base station may identify a periphery interference status by receiving and detecting the above signal. At this time, the base station may exclude corresponding pilot transmission through special symbols of UEs which are the counter parties of uplink reception. To this end, the base station may specially define a special pilot pattern or all subcarrier resources within the corresponding symbol as null power pilot.

Hereinafter, the time slot transmission resource structure intended for interworking within a random FFT/IFFT size will be described.

Figure 11:
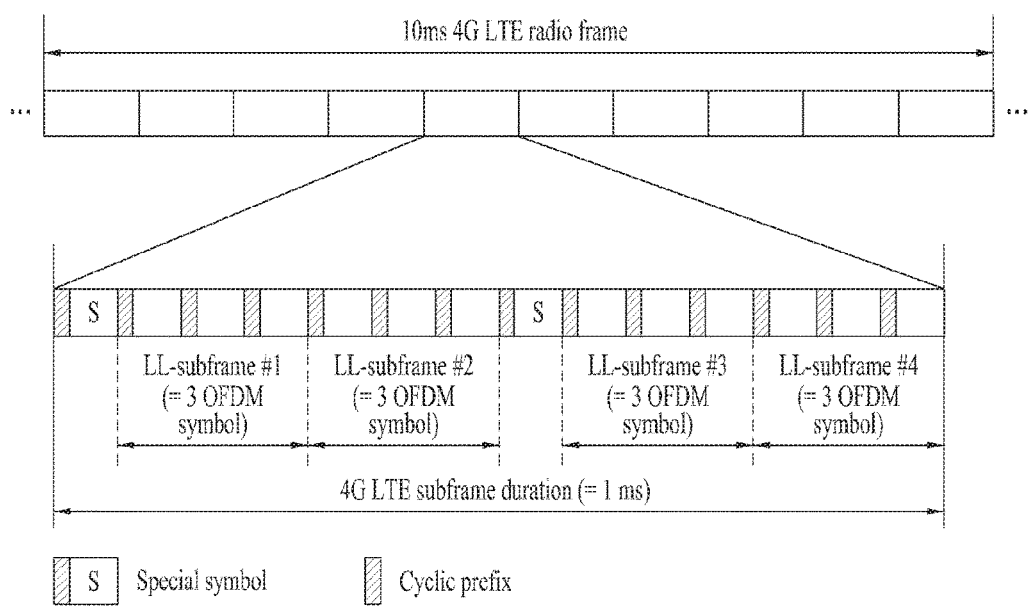
FIG. 11 is a diagram illustrating a time slot transmission resource structure intended for interworking within a random FFT/IFFT size as one example of a resource structure applied to the present invention.

FIG. 11 is a diagram illustrating a time slot transmission resource structure intended for interworking within a random FFT/IFFT size as one example of a resource structure applied to the present invention.

As described with reference to FIG. 8, in the present invention, a subframe comprised of N (N≥1) number of OFDM symbols is defined. Also, M number of subframes comprised of N number of OFDM symbols and P number of special symbols (SS) for a control physical signal or a control information transmission channel are grouped to define a random radio frame structure.

In this case, the subframe comprised of N number of OFDM symbols is defined to correspond to TTI which is a scheduling unit of one packet scheduler. The subframe corresponding to TTI which is a scheduling unit of the picket scheduler will be referred to as an advanced subframe, a low-latency subframe, or a low latency (LL) subframe. Meanwhile, the subframe corresponding to TTI which is the legacy scheduling unit will be referred to as a legacy subframe.

Meanwhile, in order to smoothly support matching of FDD version and TDD version of the legacy wireless communication system, a CP length and an OFDM symbol length of the wireless communication system are defined equally to each other.

Hereinafter, a method for determining the number N of OFDM symbols included in the advanced subframe will be described. As described above, referring to FIGS. 5 and 6, in the present invention for reducing radio transmission and reception latency, the advanced subframe is defined. In this case, the number of OFDM symbols included in the advanced subframe may be determined based on the One-way OTA or Roundtrip OTA latency intended by the present invention. That is, a value of the One-way OTA latency or Roundtrip OTA latency is reduced as compared with the OTA latency value illustrated in FIG. 5.

In more detail, N may be determined by the following Equation 2.

$$N = \left\lceil \frac{\text{legacy } OTA \text{ latency}}{OTA \text{ latency in advanced system}} \right\rceil \quad \text{[Equation 2]}$$

In the Equation 2, N corresponds to a minimum integer value greater than a value obtained by dividing OTA latency of the advanced system by OTA latency of the legacy system. In this case, OTA latency of the advanced system corresponds to the above One-way OTA latency or Roundtrip OTA latency value. In the legacy system, OTA latency corresponds to an OTA latency value in the system to which the new time slot resource structure is not applied.

If OTA latency of the advanced system is designed to be ¼ of OTA latency in the legacy system, N is 3. That is, the one advanced subframe may be configured to include 3 OFDM symbols.

Meanwhile, the number P of special symbols included in the one legacy subframe may be determined by the following Equation 3.

$$P = L \bmod N \quad \text{[Equation 3]}$$

In the Equation 3, L is the number of OFDM symbols included in the legacy subframe which is the subframe of the legacy system, and mod is an operator and represents a remainder value obtained by dividing L by N. That is, P corresponds to the remainder value obtained by dividing L by N.

If the legacy system is the LTE system in normal CP, since L is 14 and N is 3, P is 2. Therefore, in case of N=3, the legacy subframe includes a total of 4 advanced subframes and 2 special symbols.

If the legacy system is the LTE system in extended CP, since L is 12 and N is 3, P is 0. Therefore, in case of N=3, the legacy subframe includes a total of 4 advanced subframes only.

Alternatively, the number P of special symbols included in the one legacy subframe may be determined by the following Equation 4.

$$P = L \bmod M \quad \text{[Equation 4]}$$

In the Equation 4, M corresponds to the number of transmission times of the advanced subframe within a transmission slot of the legacy subframe.

However, if a subframe length for data channel decoding latency reduction is too short, many short subframes may be defined on a unit time slot, whereby data resource efficiency may be deteriorated. Therefore, considering efficiency of data resources, the advanced subframe may be defined to include 3 OFDM symbols. Likewise, in order to smoothly support matching of FDD version and TDD version of the legacy wireless communication system, a CP length and an OFDM symbol length of the wireless communication system are defined equally to each other. 4 advanced subframes are defined to be included in a subframe length of 1 ms which is a TTI unit of the legacy wireless communication system. 4 advanced subframes and 2 special symbols are included in a 1 ms unit length.

Hereinafter, in the present invention, a case where the above two special symbols are used for PDCCH transmission intended to transmit control information of downlink transmission scheduling to the UE will be described. However, the special symbols are not used restrictively for the PDCCH transmission, and may be used for various purposes of use as described above.

FIG. 12 is a diagram illustrating a method for using special symbols in downlink transmission as one embodiment of the present invention.

The special symbols may be used for PDCCH transmission to realize a time slot transmission resource structure intended for low transmission latency. It is premised that the time slot transmission resource structure is matched with the legacy frame structure of the 3GPP LTE as illustrated in FIG. 11.

Referring to FIG. 12, a special symbol located at the first position on the 1 ms time slot transmission resource structure may be used for common resource configuration with a PDCCH transmission resource slot of the 3GPP LTE system. A random UE to which low transmission latency time slot resource structure is applied may perform blind decoding at the special symbol located at the first position by using the same method as the legacy PDCCH decoding method.

In more detail, the UE performs blind decoding for a user common control channel on a user common search space and performs blind decoding for a user specific PDCCH on a user specific search space. To this end, a PDCCH transmission symbol slot length (or PDCCH symbol slot length inferred from PDSCH transmission start symbol index) designated as RRC parameter or CFI information of a PCFICH in the 3GPP LTE system may be designated fixedly as one symbol (see (a) of FIG. 12) or two symbols (see (b) of FIG. 12).

In accordance with downlink data transmission resource configuration information detected through the above process, the UE may identify information required for PDSCH reception with respect to first and second advanced subframes and third and fourth advanced subframes and perform decoding for the PDSCH received based on the above information. The information required for PDSCH reception is as follows:

(1) control information indicating an advanced subframe to which a PDSCH to be received by a random UE is transmitted: index or bit map (for example, 4 bits in case of FIG. 12) type control information for the cases where advanced subframe scheduling is possible may be defined;

(2) frequency resource configuration information of the PDSCH on the advanced subframe where downlink data transmission for a random UE is performed; and (3) control information required for UE reception operation such as a PDSCH related MCS, a multi-antenna MIMO transmission scheme and retransmission/new data transmission on the advanced subframe where downlink data transmission of a random UE is performed.

The control information described as above may be transmitted to the UE through one or more PDCCHs transmitted on one or two designated special symbols and required for individual decoding. Hereinafter, methods for configuring PDCCH will be suggested as follows.

Method 1: the base station may transmit all kinds of control information required for data reception within a full slot of 1 ms on a payload of one PDCCH. The UE may perform blind decoding for one PDCCH to receive downlink data.

Method 2: the base station may transmit control information required for data reception to N number of advanced subframes within a PDCCH transmission period by dividing the control information into M (<N) number of PDCCHs. The UE may perform blind decoding for M number of PDCCHs to receive downlink data based on previous RRC configuration dynamic indication.

As one embodiment, in (b) of FIG. 12, the base station may transmit a total of 2 (=M) PDCCHs to the UE. The base station may transmit, to the UE, a PDCCH for transmitting the aforementioned control information related to downlink data channel transmission for the first and second advanced subframes by carrying the corresponding control information in payload and a PDCCH for transmitting the aforementioned control information related to downlink data channel transmission for the third and fourth advanced subframes by carrying the corresponding control information in payload. The UE may perform blind decoding for the two PDCCHs to receive the downlink data.

Method 3: the base station may transmit control information required for uplink data reception to each of N number of advanced subframes within a PDCCH transmission period by dividing the control information into N number of PDCCHs. In this case, the UE may perform blind decoding for N number of PDCCHs. For example, in FIG. 12, the UE may perform blind decoding for 4 PDCCHs for decoding of a PDSCH of a subsequent advanced subframe.

In FIG. 12, frequency resource configuration is equally provided for PDSCHs of 4 advanced subframes. However, the example of FIG. 12 is only one embodiment, and frequency resource configuration is not limited to the example of FIG. 12. Frequency transmission resources of different PDSCHs per advanced subframe may be designated. In other ways, frequency resources of the PDSCHs may be configured in a unit of a plurality of some advanced subframes. For example, frequency resources of PDSCHs transmitted to a random UE through first and second advanced subframes may be configured equally, and frequency resources of PDSCHs transmitted to a random UE through third and fourth advanced subframes may be configured equally.

Among the aforementioned methods, if frequency resources of individual PDSCHs transmitted to a random UE through a plurality of advanced subframes are configured equally, various kinds of control information related to transmission schemes such as MCS and multi-antenna MIMO transmission scheme may be configured equally.

Considering the aforementioned statuses, control information may be defined. In more detail, various kinds of control information for PDSCH reception may be identified in a unit of an advanced subframe, or may be defined as one kind applied on one or more advanced subframes.

If one of two special symbols within a full length of 1 ms is used for PDCCH as illustrated in (b) of FIG. 12, the second special symbol may be used for one of purposes of use described in the present invention. In case of (b) of FIG. 12, the second special symbol may be used for downlink synchronization signal transmission, downlink channel measurement pilot (or reference signal) transmission, interference signal measurement of the UE, downlink ACK/NACK signal transmission for uplink data transmission, and downlink massive MIMO beam scanning signal transmission, as described in the present invention. Therefore, at the second special symbol, the base station may transmit a physical signal associated with each of the aforementioned used methods, and the UE may perform received detection measurement of the signal.

The downlink ACK/NACK signal for uplink data transmission may be transmitted by being multiplexed with the PDCCHs on the special symbol to which the PDCCH is used and which is used for decoding of the UE. Also, the downlink ACK/NACK signal may be configured in the same manner as a PHICH channel transmission scheme and UE reception scheme of the legacy wireless communication system.

Figure 13:
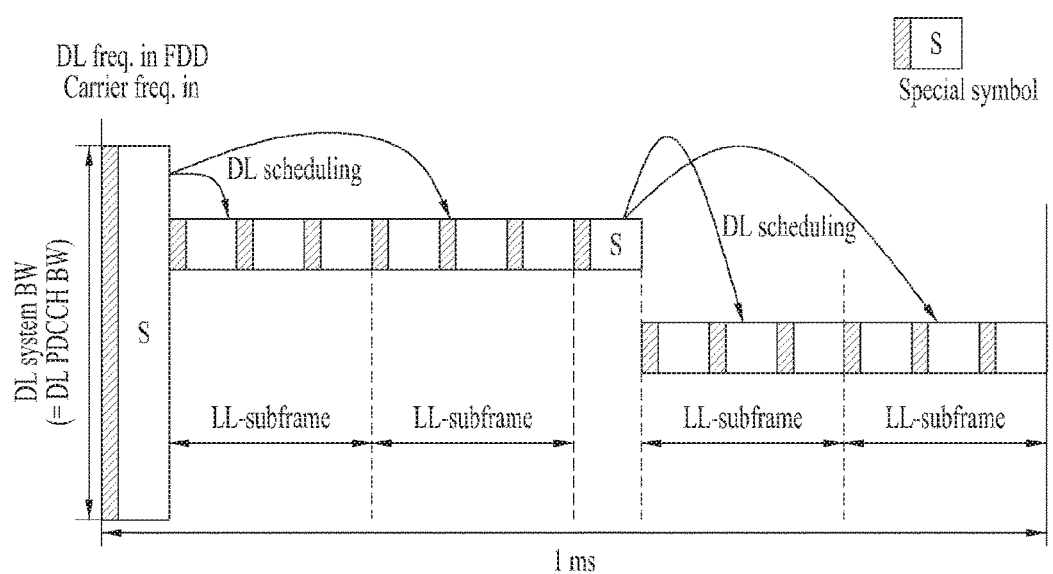
FIG. 13 is a diagram illustrating a method for using special symbols in downlink transmission as another embodiment of the present invention.
Figure 15A:
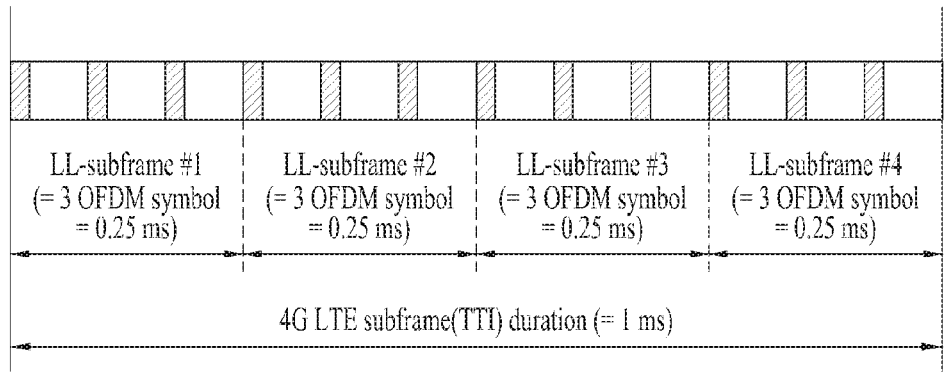
FIG. 15 is a diagram illustrating a resource structure according to the present invention in case of extended CP.
Figure 15B:
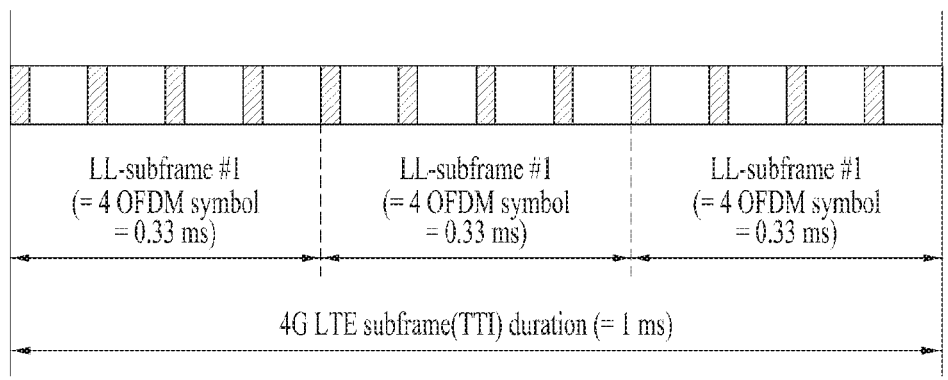
Figure 15C:
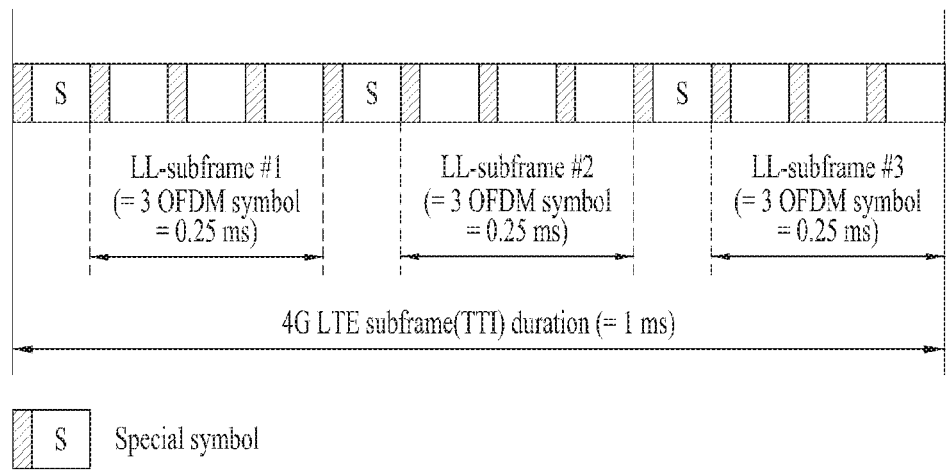
Figure 15D:
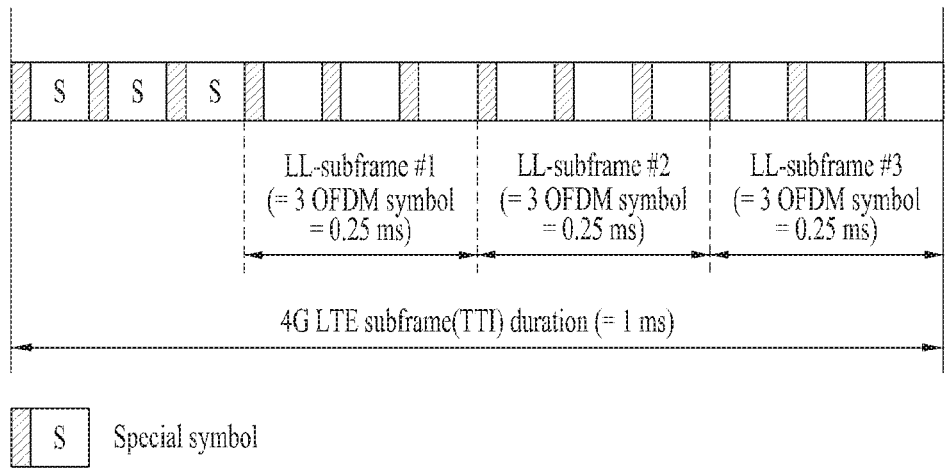
Figure 15E:
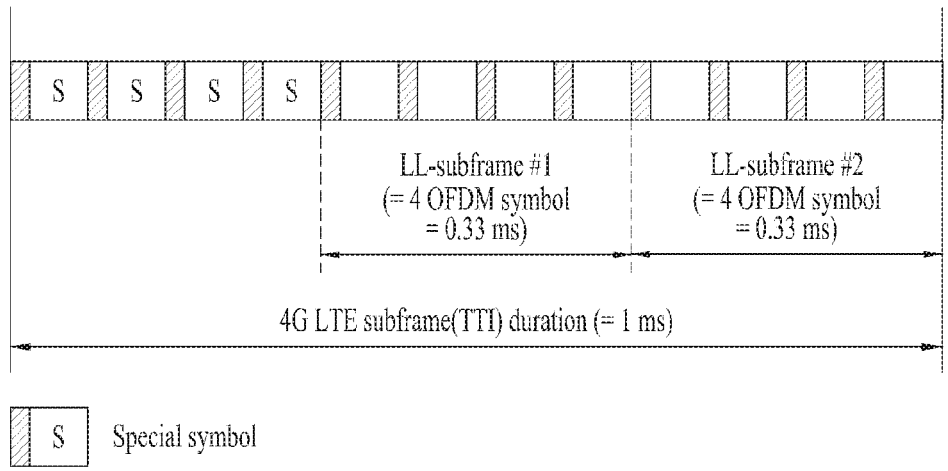
Figure 15F:
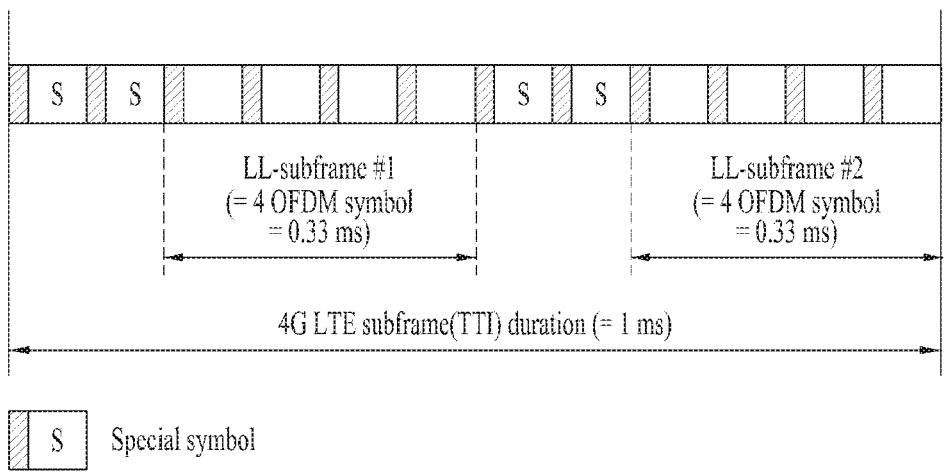

FIG. 13 is a diagram illustrating a method for using special symbols in PDCCH transmission as another embodiment of the present invention.

Referring to FIG. 13, another example of a downlink scheduling method related to PDCCH transmission on a specific symbol resource for supporting downlink data reception in a UE will be suggested.

In FIG. 13, a PDCCH within a slot of 1 ms may be transmitted through a first special symbol resource within a slot of 1 ms to signal downlink data reception related control information of a random UE. In this case, the time slot transmission resource structure is premised to be matched with the legacy frame structure of the 3GPP LTE system as illustrated in FIG. 11.

Moreover, the base station may transmit the PDCCH through a special symbol resource designated at a seventh symbol position. In this case, the PDCCH may include scheduling information for supporting data channel decoding of the UE for its subsequent PDSCH transmitted through advanced subframes for downlink transmission within a designated slot of 1 ms. At this time, a frequency resource of a second special symbol within a slot of 1 ms may be defined by a full downlink system band or a partial frequency resource band. The corresponding band of the special symbol may be designated by the following methods.

(1) Method 1: the frequency band for corresponding PDCCH transmission of the second special symbol may be designated as a frequency band designated at the latest advanced subframe prior to the second special symbol within the corresponding slot of 1 ms. In this case, the latest advanced subframe corresponds to one of advanced subfames #1 and #2 illustrated in FIG. 13, which is scheduled with the highest index. In this case, downlink transmission scheduling of advanced subframes #3 and #4 transmitted using the second special symbol within the slot of 1 ms is performed on the premise that at least one downlink data is transmitted on the advanced subframes #1 and #2 prior to the second special symbol.

In view of the UE, If the UE does not detect its downlink data channel related PDCCH through the first special symbol of the designated slot (that is, 1 ms slot of FIG. 13), the corresponding UE may not perform decoding for the second special symbol resource on the assumption that there is no PDCCH to be decoded by the UE in the second special symbol. A failure in detection of the PDCCH may mean that there is no PDSCH to be received by the corresponding UE in the advanced subframes #3 and #4. Therefore, the UE may not perform data channel decoding for the advanced subframes #3 and #4.

(2) Method 2: the base station may transmit at least one PDCCH through the first special symbol, and the UE that has received the PDCCH may acquire decoding target frequency resource control information of the second special symbol through demodulation decoding of a corresponding physical control channel. The PDCCH may include control information related to reception and transmission of a downlink or uplink data channel. If the base station transmits at least one PDCCH, which includes control information on a specific UE, through the first special symbol, the base station may include frequency resource information of the second special symbol in control information of payload of all of the corresponding PDCCHs or payload of specific some of the corresponding PDCCHs.

When the frequency resource information of the second special symbol is included in some PDCCHs or one PDCCH not all of the PDCCHs, the frequency resource information may first be included in a control channel for a downlink data channel. Also, if a PDCCH that will include the corresponding information is selected, the PDCCH may be selected for advanced subframe indexes for scheduling a downlink or uplink data channel in an ascending order or descending order.

In the present invention, description of FIGS. 11 to 13 is made on the assumption of matching with the legacy wireless communication system (for example, 3GPP LTE system) within FFT/IFFT size. However, the technologies suggested in the description of FIGS. 11 to 13 according to the present invention may be applied even on the assumption of carrier configuration and channel design for the new system. In this case, related channels may newly be designed in accordance with a new system design status to transmit the PDCCH and a downlink ACK/NACK signal for uplink data transmission, which is multiplexed as the case may be, and reception operations of the UE may newly be defined.

In the method for transmitting a PDCCH through a special symbol resource as described in FIGS. 12 to 13, a specific PDCCH transmitted from the base station to the UE may have attributes of control information indicating the result of uplink transmission scheduling to the UE. The specific PDCCH may be expressed as an uplink grant (PDCCH) physical downlink control channel. In this case, the uplink time slot transmission resource structure may be used as a structure intended for low transmission latency.

For example, 4 advanced subframes may be configured within a subframe of 1 ms in the 3GPP LTE system as a basic configuration of the time slot transmission resource structure of FIG. 11. In this case, the position of the special symbol applied to the uplink may be varied depending on its purpose of use.

FIG. 14 is a diagram illustrating a method for using a special symbol in uplink transmission as other embodiment of the present invention.

It is assumed that time slot transmission resource structures suggested in FIG. 14 are used for uplink transmission. However, as the case may be, the time slot transmission resource structures suggested in FIG. 14 may be used as downlink time slot transmission resource structures in accordance with a special purpose of use of the special symbol. Likewise, the time slot transmission resource structures may be used for uplink transmission on the premise that the time slot transmission resource structure intended for downlink transmission described in FIGS. 11 and 12 supports a special purpose of use of the special symbol. Resources of special symbols of a special position as suggested in FIG. 14 may be used to transmit a physical signal for the purpose of one of uplink synchronization signal transmission, uplink channel sounding signal transmission, PUCCH transmission, and physical signal transmission for interference signal measurement of the UE.

As a method for transmitting user transmission scheduling indication control information on 4 uplink advanced subframes shown in FIG. 13 through an uplink grant PDCCH, the method for transmitting a downlink physical channel as suggested in FIGS. 11 and 12 may be used.

Also, as detailed methods for generating control information for designating whether an advanced subframe is transmitted to an uplink for a random UE, frequency resource configuration, MCS and a transmission scheme, related methods for defining control information for indicating downlink data reception suggested in the description of FIG. 12 or 13 may be used.

Also, as a method for configuring a PDCCH for transferring configured uplink grant control information, methods for configuring a PDCCH to indicate downlink data reception as disclosed in the description of FIG. 12 or 13 may be used.

Meanwhile, the time slot transmission resource structure intended for interworking with the frame structure of the legacy wireless communication system (for example, 3GPP LTE) within a random FFT/IFFT size as suggested in FIG. 11 may be configured based on, but not limited to, normal CP application of the 3GPP LTE, which configures a 1 ms subframe of 14 OFDM symbols. That is, in case of extended CP of the 3GPP LTE system, the suggestions of the present invention may be used based on the time slot transmission resource structure of 12 OFDM symbols.

FIG. 15 is a diagram illustrating a resource structure according to the present invention in case of extended CP.

A time slot transmission resource structure shown in (a) of FIG. 15 and (b) of FIG. 15 does not include special symbols unlike the aforementioned resource structure. In (a) of FIG. 15, the time slot transmission resource structure corresponding to a case where 3 OFDM symbols are configured as one low latency subframe (LL-subframe) like normal CP is suggested, and in (b) of FIG. 15, the time slot transmission resource structure configured to include 4 OFDM symbols in one LL-subframe in normal CP is suggested.

On the other hand, (d) and (d) of FIG. 15 and (e) and (f) of FIG. 15 respectively illustrate a time slot transmission resource structure defining 3 special symbols and a time slot transmission resource structure defining 4 special symbols. In the individual time slot transmission resource structures shown in (c) to (f) of FIG. 15, the special position of the special symbols may be configured differently from that those shown in FIG. 15 depending on a purpose of use of the special symbols. The description of the use examples of all the special symbols and the network radio node (or base station) and UE operation according to the use of the special symbols in case of normal CP may equally be applied to the time slot transmission resource structure specifically configured for extended CP.

Figure 16:
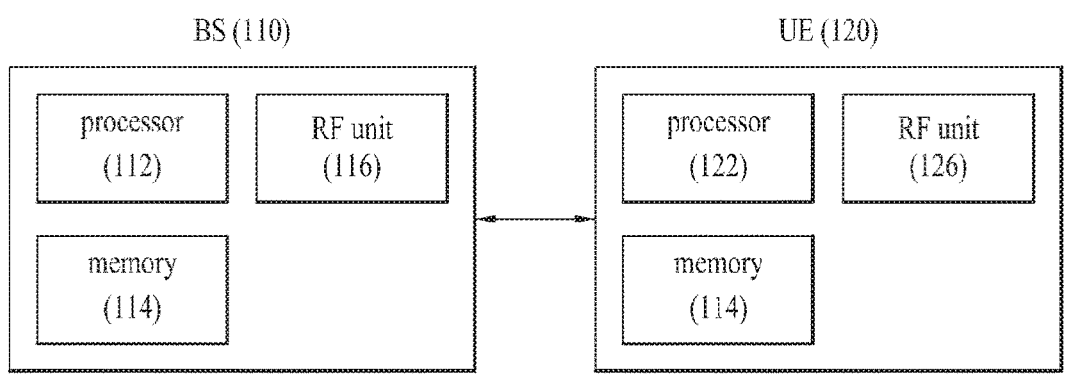
FIG. 16 is a block diagram illustrating a communication apparatus according to one embodiment of the present invention.

FIG. 16 is a block diagram illustrating a communication apparatus according to one embodiment of the present invention.

Referring to FIG. 16, the wireless communication system includes a base station (BS) 110 and a user equipment (UE) 120. If the wireless communication system includes a relay, the base station and the UE may be replaced with the relay.

On a downlink, a transmitter may be a part of the base station 110, and a receiver may be a part of the UE 120, On an uplink, the transmitter may be a part of the UE 120, and the receiver may be a part of the base station 110.

The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The UE 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this specification, the embodiments of the present invention have been described based on data transmission and reception between a base station and a user equipment. This transmission and reception is equally/similarly extended to signal transmission and reception between a user equipment and a relay or between a base station and a relay. In this specification, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a 'terminal' may be replaced with terminologies such as a user equipment (UE), a mobile station (MS), and a mobile subscriber station (MSS).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used for a user equipment, a base station, or other equipment of a wireless communication system.

The invention claimed is:

1. A method for transmitting a signal for low transmission latency in a wireless communication system, the method comprising:
    mapping a signal to at least one advanced subframe included in a radio frame; and
    transmitting, by a transmitting side, the at least one advanced subframe to a receiving side,
    wherein the radio frame comprises the at least one advanced subframe and at least one special symbol separated from the at least one advanced subframe,
    wherein the at least one advanced subframe comprises N number of symbols, wherein N is smaller than or equal to 3, and
    wherein the at least one special symbol is transmitted in a different time duration from a transmission time duration of the at least one advanced subframe.

2. The method according to claim 1, wherein the radio frame includes at least two advanced subframes.

3. The method according to claim 1, wherein the at least one special symbol includes control and/or configuration information on the at least one advanced subframe.

4. The method according to claim 1, wherein the transmitting includes transmitting of at least one legacy subframe comprising L number of symbols, L being at least 12.

5. The method according to claim 1, wherein a symbol of the N number of symbols is an Orthogonal Frequency Division Multiple Access (OFDMA) symbol or a Single Carrier Frequency Division Multiple Access (SC-FDMA) symbol.

6. The method according to claim 1, wherein the N number of symbols included in the advanced subframe is determined based on a transmission latency value.

7. The method according to claim 1, wherein the different time duration and the transmission time duration of the at least one advanced subframe are located within a transmission time duration of a legacy subframe.

8. The method according to claim 1, wherein data is transmitted through a data channel in the at least one advanced subframe, and the control information is transmitted through a control channel by the at least one special symbol.

9. The method according to claim 1, wherein the at least one special symbol is used for transmission of at least one of a downlink physical control channel, a downlink synchronization signal, a reference signal or an acknowledgement/non-acknowledgement (ACK/NACK) signal, or measurement of interference.

10. The method according to claim 1, wherein a transmission time duration of one advanced subframe corresponds to one transmission time interval (TTI) as one scheduling unit of a packet scheduler.

11. A method for receiving a signal for low transmission latency by a receiving side in a wireless communication system, the method comprising:
    receiving a signal from a transmitting side through at least one advanced subframe included in a radio frame; and
    decoding the received signal,
    wherein the radio frame comprises the at least one advanced subframe and at least one special symbol separated from the at least one advanced subframe,
    wherein the at least one advanced subframe comprises N number of symbols, wherein N is smaller than or equal to 3, and
    wherein the at least one special symbol is received in a different time duration from a transmission time duration of the at least one advanced subframe.

12. An apparatus for transmitting a signal for low transmission latency in a wireless communication system, the apparatus comprising:
    a processor mapping a signal to at least one advanced subframe included in a radio frame; and
    a transmission module transmitting the signal in the least one advanced subframe,
    wherein the radio frame comprises the at least one advanced subframe and at least one special symbol separated from the at least one advanced subframe,
    wherein the at least one advanced subframe comprises N number of symbols, wherein N is smaller than or equal to 3, and
    wherein the at least one special symbol is transmitted in a different time duration from a transmission time duration of the at least one advanced subframe.

13. An apparatus for receiving a signal for low transmission latency in a wireless communication system, the apparatus comprising:
    a receiving module receiving a signal through at least one advanced subframe included in a radio frame; and
    a processor decoding the received signal,
    wherein the radio frame comprises the at least one advanced subframe and at least one special symbol separated from the at least one advanced subframe,
    wherein the at least one advanced subframe comprises N number of symbols, wherein N is smaller than or equal to 3, and
    wherein the at least one special symbol is transmitted in a different time duration from a transmission time duration of the at least one advanced subframe.

* * * * *